Aug. 21, 1934.   O. L. STARR   1,970,949
TRACTOR ATTACHMENT
Filed Jan. 3, 1933   3 Sheets-Sheet 1
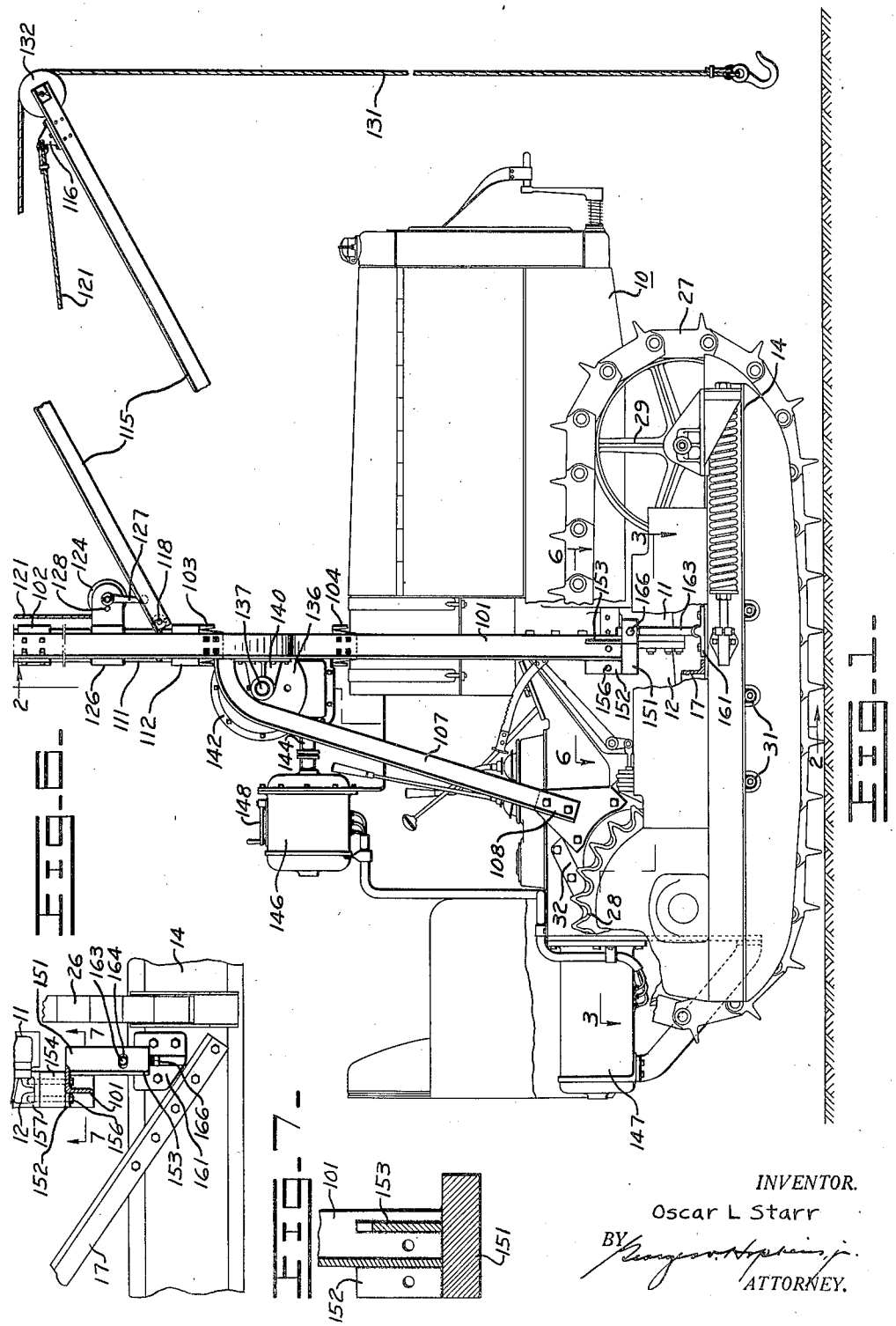
INVENTOR.
Oscar L Starr
BY
ATTORNEY.

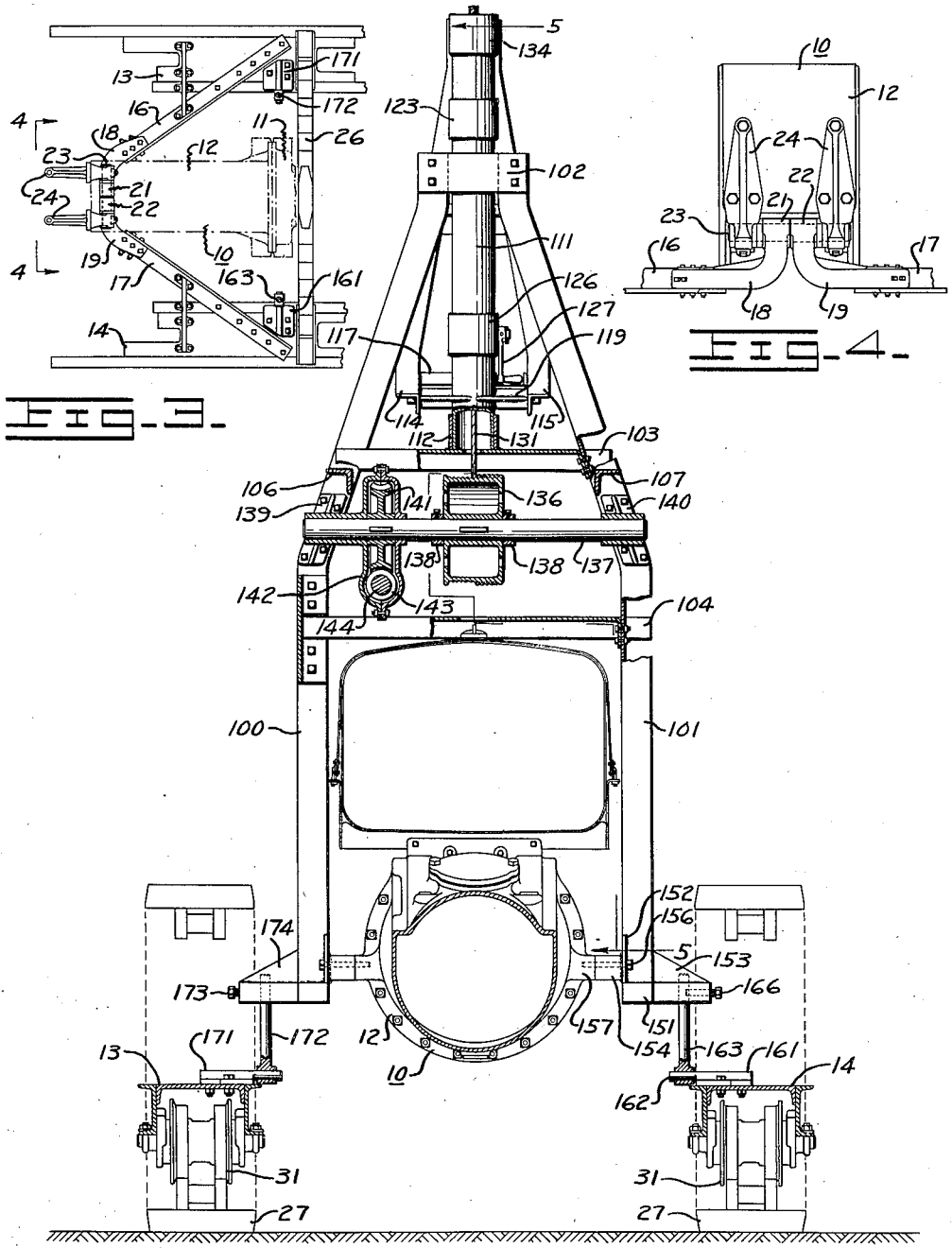

Aug. 21, 1934.　　　O. L. STARR　　　1,970,949
TRACTOR ATTACHMENT
Filed Jan. 3, 1933　　　3 Sheets-Sheet 3

INVENTOR.
Oscar L. Starr
BY
ATTORNEY

Patented Aug. 21, 1934

1,970,949

UNITED STATES PATENT OFFICE 1,970,949

TRACTOR ATTACHMENT

Oscar L. Starr, Mission San Jose, Calif., assignor to Caterpillar Tractor Co., San Leandro, Calif., a corporation of California Application January 3, 1933, Serial No. 649,877

25 Claims. (Cl. 254—166)

The present invention relates to attachments for track-type tractors and more particularly to means for mounting such attachments thereon. Track-type tractors comprise generally a power plant or main frame which is supported on a pair of track units having pivotal and resilient connections therewith whereby the track units oscillate with respect to the main frame in traveling over rough, uneven ground. In mounting auxiliary mechanisms, such as hoists, for example, on such tractors, it is desirable that the track units remain free to oscillate during travel of the tractor, and it is also desirable, for obvious reasons, that the auxiliary mechanism be supported rigidly during operation thereof.

The instant invention accomplishes both of the above ends by providing means for mounting an auxiliary mechanism on a track-type tractor whereby the frame of the mechanism has a fixed connection with the main frame of the tractor and optionally engageable rigid connections with the truck frames of the track units. The fixed connection between the tractor main frame and the auxiliary frame provides a support for the auxiliary mechanism in traveling from one place to another, while the optionally engageable connections from the auxiliary frames to the truck frames provide a rigid support for the auxiliary mechanism when it is in use.

It is an object of the invention to provide means for mounting an auxiliary mechanism on a vehicle.

Another object of the invention is to provide a vehicle and an attachment therefor adapted to be supported resiliently during travel of the vehicle and rigidly when the attachment is in use.

Another object of the invention is to provide a vehicle including a main frame resiliently supported on ground-engaging means and an auxiliary mechanism adapted to be supported resiliently or rigidly on said vehicle.

Another object of the invention is to provide means for optionally converting a resilient support for a frame into a rigid support.

Another object of the invention is to provide means for mounting an auxiliary attachment on a track-type tractor whereby the weight of the attachment is transmitted directly to the track units or through a resilient connection therewith.

Another object of the invention is to provide a track-type tractor having a main frame and truck frames, and an auxiliary frame having a fixed connection to the main frame and releasable connections to the truck frames.

Another object of the invention is to provide a rigid weight supporting connection from an auxiliary frame to the truck frames of a tractor, including pairs of brackets and members adapted to connect corresponding brackets of the pairs.

Another object of the invention is to provide a tractor and a hoist, and means for mounting said hoist resiliently or rigidly on said tractor.

Another object of the invention is to provide a tractor having a main frame and truck frames, and a hoist having a frame detachably mounted on the main frame and adapted to be connected to said truck frames.

Other objects will appear as the description progresses.

Description of figures

Fig. 1 is a side elevation a tractor with a hoist mounted thereon according to the instant invention.

Fig. 2 is a transverse vertical section taken on the line 2—2 in Fig. 1.

Fig. 3 is a diagrammatic view on the line 3—3 in Fig. 1 illustrating the pivotal and resilient connections between the tractor body and the truck frames.

Fig. 4 is a view on the line 4—4 in Fig. 3.

Fig. 6 (Sheet 1) is a view on the line 6—6 in Fig. 1 illustrating the means for mounting the hoist on the tractor.

Fig. 7 is a section on the line 7—7 in Fig. 6.

DESCRIPTION OF MACHINE

Tractor

Figure 5:
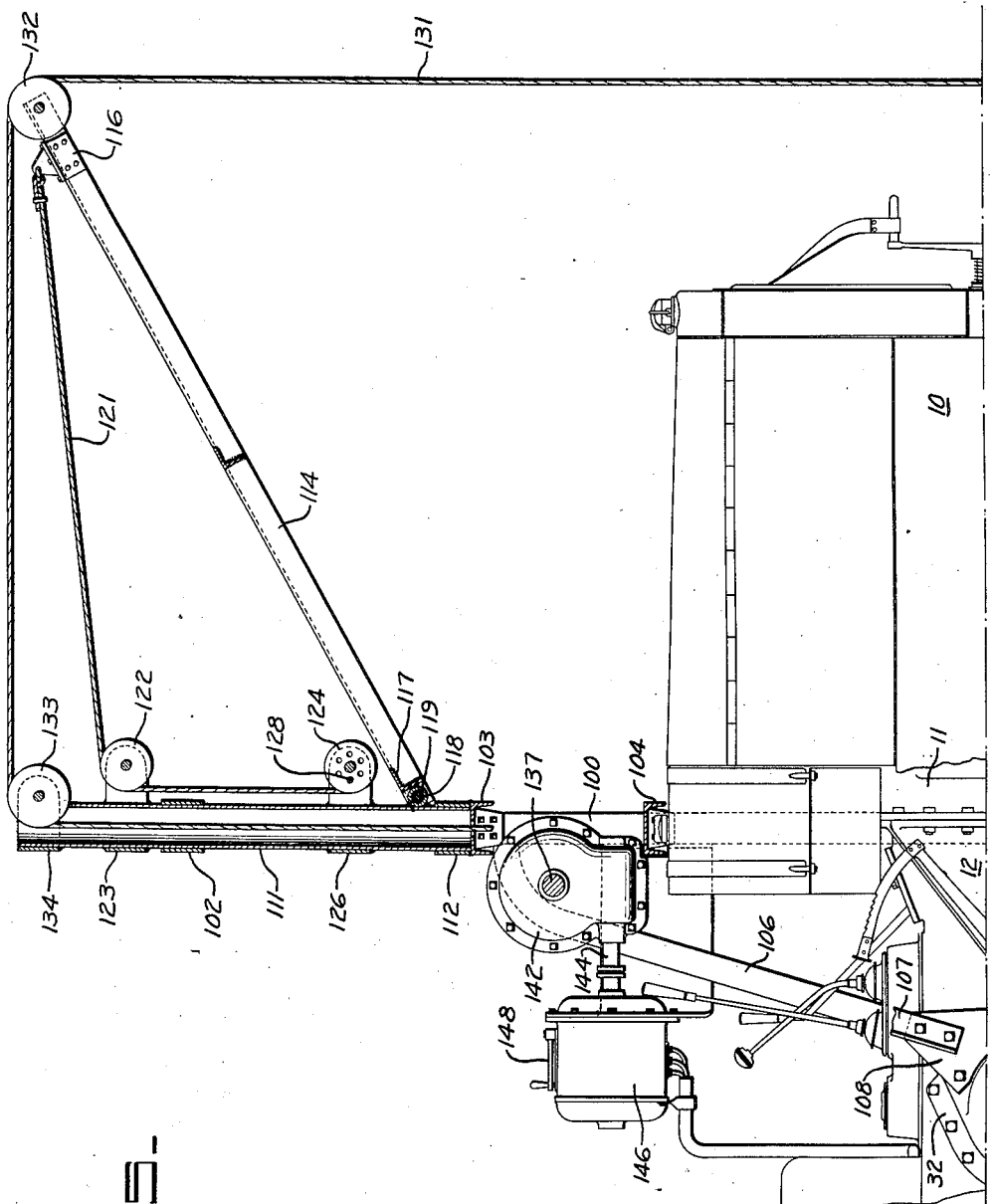
Fig. 5 is a section on the line 5—5 in Fig. 2.

The tractor disclosed herein is of the track type and includes main frame 10 (Fig. 1) comprising crankcase 11 and transmission case 12 rigidly bolted thereto. Frame 10 is mounted on similar truck frames 13, 14 (Figs. 2 and 3), respectively, having a pivotal connection and a resilient connection therewith. The pivotal connection includes rearwardly converging angles 16, 17 (Figs. 3 and 4) having their outer ends secured to truck frames 13, 14, respectively, and having brackets 18, 19, secured to the inner ends thereof. Said brackets 18, 19, have apertured bosses 21, 22 formed in the upturned ends thereof pivoted on shaft 23 secured in similar brackets 24 bolted to the rear end of said frame 10. Equalizer spring 26 (Fig. 3) is mounted at its ends on said truck frames 13, 14, and at its center supports main frame 10. Thus it is seen that the main frame of the tractor is supported on the truck frames which have a pivotal connection therewith at the rear end and a resilient connection therewith adjacent the front end. Tracks 27 (Figs. 1 and 2) are mounted on driving sprockets 28 and front idlers 29, the weight being transmitted thereto through truck rollers 31 mounted in the truck frames. Sprockets 28 are driven from the tractor engine through final drive assemblies in final drive housings 32 (one of which is seen in Fig. 1) in a well-known manner, as determined by the tractor controls located at the operator's station on the rear end of the main frame.

Hoist

The hoist disclosed herein includes a frame, a mast revolubly mounted in the frame, and a boom pivotally mounted on the mast. A self-locking drive is provided for the hoist cable which is driven from a reversible electric motor, powered from a generator driven from the tractor engine.

The hoist frame includes vertical side angles 100, 101 (Figs. 1 and 2) which converge at their upper ends, and are bolted to connection 102 which provides a bearing support for the mast, as hereinafter described. Cross channels 103, 104 (Fig. 2) connect said side angles intermediate their ends to provide a rigid frame construction. Said channel 103 also serves to support the mast as described hereinafter. Similar inclined braces 106, 107 (Figs. 1 and 5) have their upper ends welded (Fig. 2) to respective side angles 100, 101 and at their lower ends have similar gusseted connections 108 (Fig. 1) to final drive housings 32. The means for mounting side angles 100, 101 on the tractor is described hereinafter.

The hoist mast is revolubly mounted in the hoist frame and comprises pipe 111 (Figs. 2 and 5) having its lower end supported on cross channel 103 within bearing collar 112 welded on said channel. Pipe 111 is supported adjacent its upper end in connection 102 as stated hereinbefore. The mast provides a revoluble support for the boom, the boom lift, and the hoisting cable.

The boom is pivotally supported on the mast adjacent the lower end thereof, and the outer end thereof is supported by a cable which is adjustable to vary the height of the outer end of the boom. The boom comprises spaced angles 114, 115 (Figs. 2 and 5) which converge at their outer ends, being secured to connection 116 (Fig. 5). At their inner ends, said angles are connected by cross angle 117 welded therebetween. Adjacent cross angle 117, the ends of said angles 114, 115 are apertured to receive shaft 118 which is mounted in a suitable bushing in collar 119 (Figs. 2 and 5) welded on mast 111. Thus the inner end of the boom is pivotally supported adjacent the lower end of the mast. The outer end of the boom provides a mounting for a sheave over which the hoist cable passes, and is adjustably supported from the mast. Cable 121 (Figs. 1 and 5) is secured to connection 116, passes over sheave 122 mounted in bracket 123 welded on mast 111, and extends downwardly to pulley 124 to which it is secured. Pulley 124 is mounted in bracket 126 welded on mast 111. Said pulley 124 is rotated by handle 127 (Fig. 1) to wind or unwind cable 121 whereby the outer end of the boom is raised or lowered. Pin 128 (Figs. 1 and 5) is adapted to be inserted in opposite apertures in bracket 126 and any one of a plurality of apertures in pulley 124 to maintain the adjusted height of the boom.

Hoist cable 131 (Figs. 1 and 5) has a hook on the free end thereof and extends over sheave 132 mounted in the end of the boom, sheave 133 (Fig. 5) mounted in bracket 134 welded on mast 111, and down through said mast to cable drum 136 (Fig. 2) keyed on shaft 137 between collars 138. Said shaft 137 is mounted in brackets 139, 140 bolted on respective frame angles 100, 101. Power-operated means are provided for rotating the cable drum to raise or lower the load. Worm wheel 141 is keyed on shaft 137 within housing 142 which is integral in part with bracket 139, and said worm wheel is driven by worm 143 on shaft 144 mounted in said housing. Shaft 144 (Fig. 1) is driven by electric motor 146 which is powered from generator 147 driven from the tractor engine. Motor 146 is controlled by switch control lever 148.

From the foregoing description it is seen that the hoist includes a frame in which a mast is revolubly supported and that the mast supports an adjustable boom. The hoist cable passes over sheaves on the boom and the mast and is operated to raise or lower the load by power generated from the tractor engine.

Hoist mounting means

The frame which carries the auxiliary mechanism, here shown and described as a boom hoist, is detachably mounted on the tractor, having a fixed connection to the main frame or power plant of the tractor and a releasable connection with the truck frames. As the mounting means for each side of the frame is similar, only one will be described in detail.

At its lower end, side angle 101 (Figs. 1 and 6) is provided with a bracket comprising L-shaped block 151 welded thereto, the connection being strengthened by vertical longitudinal plate 152 (Figs. 1, 6 and 7), and vertical transverse brace 153. The bracket also includes a second block 154 (Figs. 2 and 6) welded to the inner sides of angle 101 and plate 152, two transverse apertures being provided therein to receive screws 156, having threaded engagement with pad 157 integral with transmission case 12. Angle 100 (Fig. 2) is similarly secured to the opposite side of transmission case 12. Thus it is seen that the hoist frame is provided with a fixed connection to the main frame of the tractor.

This fixed connection to the main frame provides a support for the hoist when the machine is traveling from one place to another, and when relatively light loads are lifted. However, when heavy loads are lifted it is highly desirable and in some instances necessary that a rigid weight-transmitting connection be provided from the hoist to the truck frames, and releasable means are provided for accomplishing this end. Bracket 161 (Figs. 1 and 2) bolted on truck frame 14 has integral shaft extension 162 (Fig. 2) projecting inwardly from said truck frame. Rod 163 is pivotally supported at its lower end on said extension 162 and extends upwardly through longitudinally elongated aperture 164 (Fig. 6) in the transverse arm of L-shaped block 151. Set screw 166 (Fig. 2) threaded in said block 151 is adjustable whereby the inner end thereof is engageable with a recessed portion of said rod 163 whereby truck frame 14 is rigidly connected to block 151 of the hoist frame as illustrated in Fig. 2. Bracket 171 on truck frame 13, rod 172, and set screw 173 in bracket 174 on angle 100 provide a similar releasable connection from the left side of the hoist frame to truck frame 13. With the mounting means adjusted as shown in Fig. 2, the weight of any load that is lifted is supported from the ground by a rigid structure, any yielding of the hoist frame due to the equalizer spring support for the front of the power plant of the tractor being eliminated. During travel of the tractor, set screws 166 are adjusted to break the connection from the truck frames to the respective sides of the hoist frame, and the elongated apertures in the frame brackets permit oscillation of the supporting rods therein as the truck frames oscillate in traveling over uneven ground. Thus it is seen that a selectively adjustable hoist mounting means is provided whereby the truck frames, which oscillate during travel of the machine form part of a rigid weight supporting structure during operation of the hoist.

I, therefore, claim as my invention:

1. The combination with a track-type tractor having a main frame and truck frames, means connecting said truck frames to said main frame for oscillatory movement with respect to said main frame, and a hoist having a frame, of means for mounting said hoist on said tractor including a fixed connection between the main frame and the hoist frame, and a releasable connection between the hoist frame and the truck frames whereby the hoist is supported on the main frame of the tractor when the tractor is traveling to allow said oscillatory movement of the truck frames, and on the truck frames when the hoist is in operation.

2. The combination with a track-type tractor having a main frame and truck frames, means connecting said truck frames to said main frame for oscillatory movement with respect to said main frame, and a hoist having a frame detachably mounted on said main frame, of means for providing a rigid weight supporting connection from said hoist frame to said truck frames.

3. The combination with a track-type tractor having a main frame and truck frames, means connecting said truck frames to said main frame for oscillatory movement with respect to said main frame, and a hoist having a frame detachably mounted on said main frame, of means for providing a rigid weight supporting connection from said hoist frame to said truck frames, comprising brackets secured to said hoist frame and detachable therewith, members mounted on said truck frames and engaging said brackets, and adjustable elements for connecting said members and said brackets.

4. The combination with a track-type tractor having a main frame and truck frames having a pivotal connection and a resilient connection with said main frame, of means for mounting an auxiliary frame on said tractor including means for establishing a rigid connection between said main frame and said truck frames.

5. The combination with a track-type tractor having a main frame and truck frames, means connecting said truck frames to said main frame for oscillatory movement with respect to said main frame, and an auxiliary frame, of means for mounting said auxiliary frame on said tractor including a fixed connection between said auxiliary frame and said main frame, and an optionally releasable connection between said auxiliary frame and said truck frames whereby the weight of said auxiliary frame is transmitted directly to said truck frames.

6. The combination with a track-type tractor having a main frame and truck frames and an auxiliary frame, of means for mounting said auxiliary frame on said tractor including a fixed connection between said auxiliary frame and said main frame, and an optionally releasable connection between said auxiliary frame and said truck frames including brackets on said auxiliary frame, members mounted on said truck frames, and means for connecting said brackets and said members.

7. The combination with a track-type tractor having a main frame and truck frames and an auxiliary frame, of means for mounting said auxiliary frame on said tractor including a fixed connection between said auxiliary frame and said main frame, and an optionally releasable connection between said auxiliary frame and said truck frames including brackets on said auxiliary frame, members mounted on said truck frames, and elements mounted on said brackets and adjustable into interlocking engagement with said members.

8. The combination with a track-type tractor having a main frame and truck frames, and an auxiliary frame, of means for mounting said auxiliary frame on said tractor including a fixed connection between said auxiliary frame and said main frame, and an optionally releasable connection between said auxiliary frame and said truck frames including brackets on said auxiliary frame having apertures formed therein, rods pivoted on said truck frames and engaging said apertures, and set screws in said brackets and engageable with said rods.

9. The combination with a track-type tractor having a main frame and truck frames, of an auxiliary frame, means for mounting said auxiliary frame on said tractor including a pair of opposite brackets on said auxiliary frame, said brackets being detachably mounted on opposite sides of said main frame, a second pair of opposite brackets on said truck frames, and means for optionally connecting corresponding brackets of said pairs, each connecting means including a member mounted on one of said brackets and engaging the other of said brackets.

10. The combination with a track-type tractor having a main frame and truck frames, of an auxiliary frame, means for mounting said auxiliary frame on said tractor including a pair of opposite brackets on said auxiliary frame, said brackets being detachably mounted on opposite sides of said main frame, a second pair of opposite brackets on said truck frames, and means for optionally connecting corresponding brackets of said pairs, each connecting means including an apertured extension of one of said brackets, a member mounted on the other of said brackets and engaging the aperture in said extension, and an adjustable element mounted on one of said brackets and movable into interlocking engagement with said member.

11. The combination with a track-type tractor having a main frame and truck frames, and a hoist having a frame detachably mounted on said main frame, of means for providing a rigid weight supporting connection from said hoist frame to said truck frames, comprising rods pivotally mounted on said truck frames and engaging said hoist frame.

12. The combination with a track-type tractor having a main frame and truck frames, and a hoist having a frame detachably mounted on said main frame, of means for providing a rigid weight supporting connection from said hoist frame to said truck frames, comprising a pair of opposite brackets on said hoist frame, a second pair of opposite brackets mounted on said truck frame, members pivotally mounted on said second pair of brackets, and engaging said first pair of brackets, and adjustable elements for connecting said members and said first pair of brackets.

13. The combination with a track-type tractor having a main frame and truck frames, and a hoist having a frame detachably mounted on said main frame, of means for providing a rigid weight supporting connection from said hoist frame to said truck frames, comprising brackets on said hoist frame having elongated apertures formed therein, members pivotally mounted on said truck frames and passing through said apertures, and set screws mounted in said brackets and engageable with said members to provide a rigid weight-transmitting connection from said hoist frame to said truck frames.

14. The combination with a track-type tractor having a main frame and truck frames having a pivotal connection and a resilient connection with said main frame, of means for mounting an auxiliary frame on said tractor including a fixed connection between said auxiliary frame and said main frame, and an optionally releasable connection between said auxiliary frame and said truck frames whereby the weight of said auxiliary frame is transmitted directly to said truck frames.

15. The combination with a track-type tractor having a main frame and truck frames having a pivotal connection and a resilient connection with said main frame, of means for mounting an auxiliary frame on said tractor including a fixed connection between said auxiliary frame and said main frame, and an optionally releasable connection between said auxiliary frame and said truck frame including brackets on said auxiliary frame, members mounted on said truck frames, and elements mounted on said brackets and adjustable into interlocking engagement with said members.

16. The combination with a track-type tractor having a main frame and truck frames having a pivotal connection and a resilient connection with said main frame, of means for mounting an auxiliary frame on said tractor including a fixed connection between said auxiliary frame and said main frame, and an optionally releasable connection between said auxiliary frame and said truck frame including brackets on said auxiliary frame having apertures formed therein, rods pivoted on said truck frames and engaging said apertures, and set screws mounted in said brackets and engageable with said rods.

17. In combination, a vehicle having a main frame and ground-engaging means resiliently supporting said main frame, an auxiliary frame, means for mounting said auxiliary frame on said vehicle including a fixed connection from said main frame to said auxiliary frame, and a releasable connection between said ground-engaging means and said auxiliary frame, said releasable connection including a set of brackets on said auxiliary frame, a second set of brackets on said ground-engaging means, and members mounted on one set of brackets and adapted for connection to the other set of said brackets.

18. The combination with a vehicle including ground-engaging means and a main frame resiliently supported thereon, of an auxiliary frame, means for detachably mounting said auixiliary frame on said main frame, and means for optionally providing a rigid weight supporting connection from said auxiliary frame to said ground-engaging means.

19. In a track-type tractor, having a main frame, and truck frames, alined pivotal connections between said truck frames and said main frame, resilient connections between said truck frames and said main frame, and detachable means for providing a rigid connection from said truck frames to said main frame.

20. In a track-type vehicle, a main frame, a truck frame at each side of said main frame, means connecting the truck frames to said main frame for oscillatory movement with respect to said main frame, equalizing means connected between said truck frames and said main frame, said equalizing means allowing said oscillatory movement, and releasable means providing a rigid connection from said truck frames to said main frame.

21. In a track-type vehicle, a main frame, a truck frame at each side of said main frame, means connecting the truck frames to said main frame for oscillatory movement with respect to said main frame, equalizing means connected between said truck frames and said main frame, said equalizing means allowing said oscillatory movement, a hoisting mechanism frame secured to said main frame, and releasable means providing a rigid connection from each truck frame to said main frame to support said hoisting mechanism frame on said truck frames when the hoist is in operation.

22. In a track-type vehicle, a main frame, a truck frame at each side of said main frame, means connecting the truck frames to said main frame for oscillatory movement with respect to said main frame, equalizing means connected between said truck frames and said main frame, said equalizing means allowing said oscillatory movement, a hoisting mechanism frame secured to said main frame, releasable means providing a rigid connection from each truck frame to said main frame to support said hoisting mechanism frame on said truck frames when the hoist is in operation; each releasable means including members adapted for relative movement, one of said members being supported by the truck frame and another of said members being supported by said main frame, and means for securing said members together in any oscillatory position of the truck frame.

23. In a vehicle, a main frame, ground-engaging members, means mounting said ground-engaging members for bodily movement relative to said main frame, an auxiliary hoisting mechanism frame, detachable means securing said auxiliary frame to said main frame, brackets rigidly secured to said auxiliary frame for detachment therewith, and means for establishing a rigid connection between said ground-engaging members and said brackets to support said hoisting mechanism frame by said ground-engaging members when the hoist is in operation.

24. In a track-type vehicle, a main frame, a truck frame at each side of said main frame, means connecting the truck frames to said main frame for oscillatory movement with respect to said main frame, and releasable means providing a rigid connection from each truck frame to said main frame; each releasable means including members adapted for relative movement upon oscillation of the truck frame, one of said members being supported by the truck frame and another of said members being supported by said main frame, and means for securing said members together in any oscillatory position of the truck frame.

25. The combination with a track-type tractor having a main frame, truck frames, and means connecting said truck frames to said main frame for oscillatory movement with respect to said main frame, and auxiliary means; of means mounting said auxiliary means fixedly on said main frame, and optionally releasable connecting means between said auxiliary means and said truck frames, whereby a rigid weight supporting connection is provided from said main frame to said truck frames.

OSCAR L. STARR.

DISCLAIMER 1,970,949.—*Oscar L. Starr*, Mission San Jose, Calif. TRACTOR ATTACHMENT. Patent dated August 21, 1934. Disclaimer filed September 29, 1936, by the assignee, *Caterpillar Tractor Co.*

Hereby enters this disclaimer to claims 18 and 23 of said patent.

[*Official Gazette October 20, 1936.*]